United States Patent
Watanabe

(10) Patent No.: US 8,989,800 B2
(45) Date of Patent: Mar. 24, 2015

(54) MOBILE STATION APPARATUS AND SYNCHRONIZATION TIMING DETERMINING METHOD

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 504 days.

(21) Appl. No.: 13/443,434

(22) Filed: Apr. 10, 2012

(65) Prior Publication Data

US 2012/0302174 A1    Nov. 29, 2012

(30) Foreign Application Priority Data

May 24, 2011    (JP) ................... 2011-115674

(51) Int. Cl.
| | |
|---|---|
| *H04B 7/00* | (2006.01) |
| *H04W 56/00* | (2009.01) |
| *H04W 36/00* | (2009.01) |

(52) U.S. Cl.
CPC ...... *H04W 56/0065* (2013.01); *H04W 36/0083* (2013.01)
USPC ........................................ 455/524

(58) Field of Classification Search
USPC ........................................ 455/524
See application file for complete search history.

(56) References Cited

U.S. PATENT DOCUMENTS

| | | | |
|---|---|---|---|
| 6,526,039 B1 * | 2/2003 | Dahlman et al. | 370/350 |
| 7,990,910 B2 * | 8/2011 | Watanabe | 370/324 |

FOREIGN PATENT DOCUMENTS

| | | |
|---|---|---|
| JP | 2002-503913 | 2/2002 |
| JP | 2010-021648 | 1/2010 |

* cited by examiner

*Primary Examiner* — Ankur Jain
(74) *Attorney, Agent, or Firm* — Fujitsu Patent Center

(57) ABSTRACT

A method of determining synchronization timing, comprising: transmitting transmission power information of a first base station (BS) which connects a mobile station (MS) and a second BS; switching reception frequency of the MS in the transmission period for the first BS to transmit reference signal between transmission frequencies of reference signal of the first BS and the second BS; measuring reception power received by the MS from the first BS and the second BS; determining propagation loss from the first BS and the second BS to the MS based on the measured reception power and transmission power information; determining a propagation delay difference between the first BS and the second BS to the MS based on the propagation loss; determining synchronization timing of the second base apparatus to the MS based on synchronization timing of the first BS to the MS and the propagation delay difference.

8 Claims, 10 Drawing Sheets

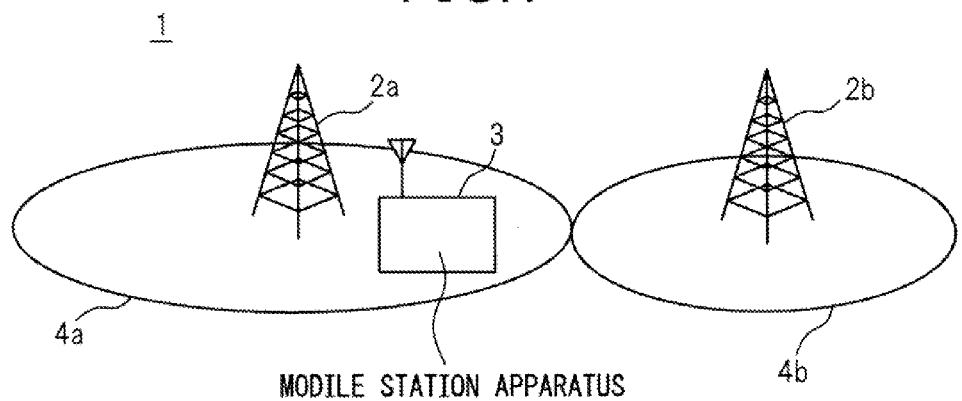
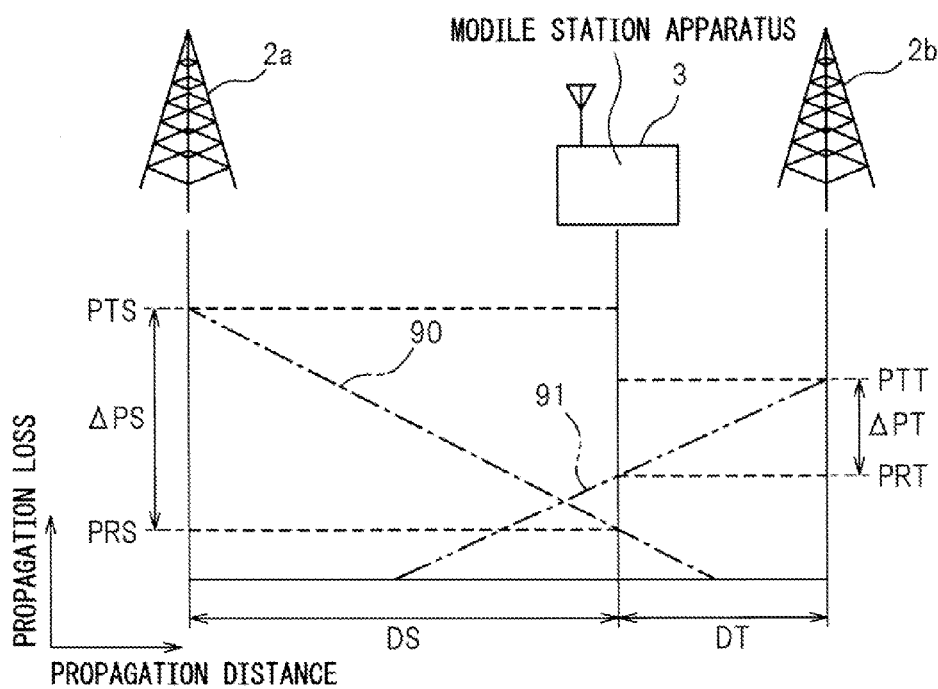

MOBILE STATION APPARATUS AND SYNCHRONIZATION TIMING DETERMINING METHOD

CROSS-REFERENCE TO RELATED APPLICATIONS

This application is based upon and claims the benefit of priority of the prior Japanese Patent Application No. 2011-115674, filed on May 24, 2011, the entire contents of which are incorporated herein by reference.

FIELD

Embodiments described in the present specification relate to establishment of temporal synchronization between a mobile station apparatus and a base station apparatus.

BACKGROUND

In cellular mobile communication, when a mobile station apparatus detects that it is situated near an end of a cell, it measures reception quality of signal from a target base station apparatus situated around the serving base station to which it is connected at present. If the measured reception quality of the target base station apparatus satisfies a prescribed reference, the mobile station executes handover for switching the current connection to the target base station apparatus. In the description that follows, a mobile station and a base station are denoted-simply as "MS" and "BS", respectively.

An asynchronous CDMA (Code Division Multiple Access) mobile communication system has been known in which a plurality of mobile stations measure relative time difference between various BS pairs and these measurements are stored in the BS. In this system, the source BS transmits estimated relative time difference between the source BS and each BS included in a list of adjoining cells to MS. Each BS included in the list can maintain a table of estimated relative time difference, and this table can be continuously updated using measurement report received from MS. Thereafter, BS transmits the entry of this table to MS in an adjoining cell list message. The BS knows the relative timing difference. When the MS starts cell search for a candidate BS, MS can estimate the timing of the candidate BS as compared to the source BS.

It has also been known to set measurement timing shifted by every guard interval length within the range of maximum delay difference before or after the timing of receiving a signal from the serving base station, and to measure reception quality of a target base station at each measurement timing. The measured best reception quality is reported to the serving base station as the reception quality of the target base station.

SUMMARY

According to an aspect of the apparatus, a mobile station apparatus is provided. The mobile station apparatus includes a base station information receiving unit which receives transmission power information of a first base station apparatus and a second base station apparatus other than the first base station apparatus and transmission frequency information of reference signal of the second base station apparatus, a frequency switching unit which, in the transmission period for the first base station to transmit reference signal, switches the reception frequency between the transmission frequencies of reference signal of the first base station apparatus and the second base station apparatus, a power measuring unit which measures the reception power received from the first base station apparatus and the second base station apparatus during the transmission period, a propagation loss determining unit which determines the propagation loss of the radio wave received from the first base station apparatus and the second base station apparatus based on the reception power measured by the power measuring unit and the transmission power information received by the base station information receiving unit, a delay difference determining unit which determines the propagation delay difference between the radio wave received from the first base station apparatus and the radio wave received from the second base station apparatus based on the propagation loss, and a synchronization timing determining unit which determines synchronization timing to the second base station apparatus based on the synchronization timing to the first base station apparatus and the propagation delay difference.

According to an aspect of the method, a synchronization timing determining method for determining the synchronization timing between a base station apparatus and a mobile station apparatus is provided. The synchronization timing determining method includes transmitting, from a first base station apparatus to a mobile station apparatus, transmission power information from the first base station apparatus and a second base station apparatus other than the first base station apparatus and transmission frequency information of reference signal of the second base station apparatus, switching the reception frequency of the mobile station apparatus during the transmission period of the first base station apparatus transmitting the reference signal between the transmission frequency of the reference signal from the first base station apparatus and the second base station apparatus, measuring the reception power received from the first base station apparatus and the second base station apparatus by the mobile station apparatus during the transmission period, determining the propagation loss of the radio wave received from the first base station apparatus and the second base station apparatus to the mobile station apparatus based on the measured reception power during the transmission period and the transmission power information transmitted from the first base station apparatus, determining the propagation delay difference of the radio waves received from the first base station apparatus and the second base station apparatus to the mobile station apparatus based on the propagation loss, and determining the synchronization timing between the second base station apparatus and the mobile station apparatus based on the synchronization timing between the first base station apparatus and the mobile station apparatus and the propagation loss.

The object and advantages of the invention will be realized and attained by means of the elements and combinations indicated in the claims. It is to be understood that both the foregoing general description and the following detailed description are exemplary and explanatory and are not restrictive of the invention, as claimed.

BRIEF DESCRIPTION OF THE DRAWINGS

FIG. 1 is a view depicting an exemplary overall construction of the communication system;

FIG. 2 is a view for illustrating a first example of the method for measuring the propagation distance difference;

DESCRIPTION OF EMBODIMENTS

1. Construction of the Communication System

Figure 3:
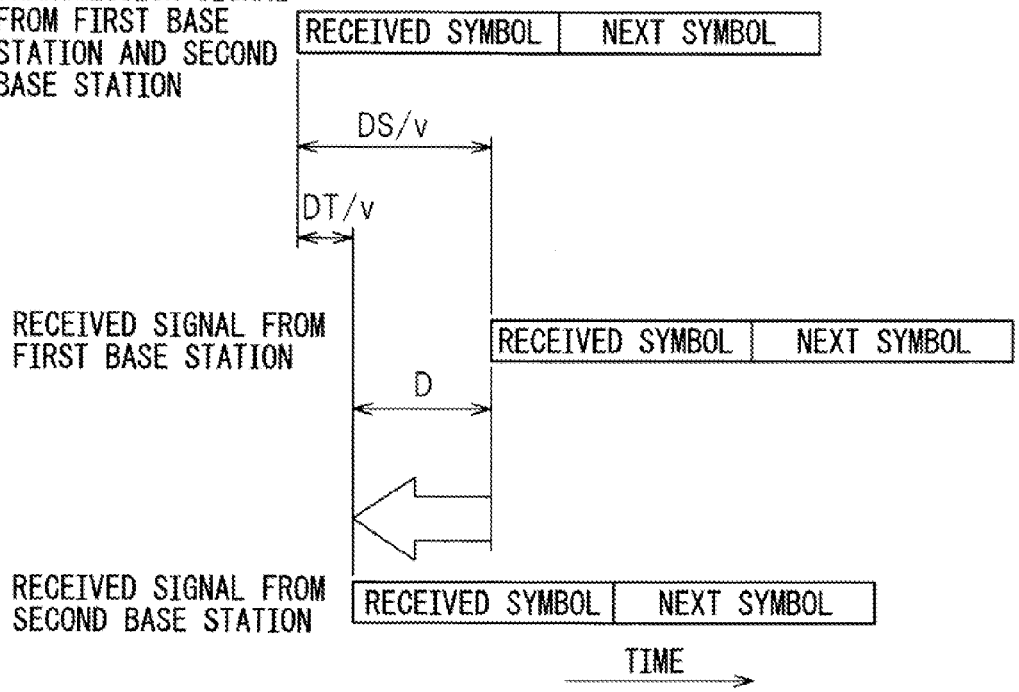
FIG. 3 is a view for illustrating the method of setting synchronization timing.

The embodiment will be described with reference to appended drawings. FIG. 1 is a view depicting an exemplary overall construction of the communication system. The communication system 1 includes a first base station 2a, a second base station 2b, and a mobile station 3. Reference numerals 4a and 4b denote schematically illustrated range of cells covered by the first base station 2a and the second base station 2b, respectively. In the description that follows, the first base station 2a and the second base station 2b are collectively denoted simply as "base station 2".

In the description that follows, the first base station 2a is the serving base station to which the mobile station 3 is currently connected, and the base station 2b is situated around the base station 2a, and is a target base station servicing at a frequency different from the base station 2a. Plural base stations around the base station 2a may be selected as the base station 2b.

2. Method of Determining the Synchronization Timing

In the communication system 1, the mobile station 3 measures the propagation distance difference between the propagation distance of signal from the first base station 2a to the mobile station 3 and the propagation distance of signal from the second base station 2b to the mobile station 3. FIG. 2 is a view for illustrating a first example of the method of measuring the propagation distance difference. Reference numerals 90 and 91 denote respectively the propagation loss characteristics of signal transmitted from the first base station 2a and the second base station 2b. The propagation loss characteristics represents the relationship between the propagation distance and the propagation loss.

The mobile station 3 receives, from the first base station 2a, the transmission power information indicating the transmission powers of the first base station 2a and the second base station 2b, PTS and PTT. Also, the mobile station 3 measures, in the transmission period for the first base station 2a to transmit the reference signal, the reception powers, PRS and PRT, at which it receives the transmitted signal from the first base station 2a and the second base station 2b, respectively.

The mobile station 3 determines the propagation loss of the signal during propagation from the first base station 2a to the mobile station 3 ($\Delta PS=PTS-PRS$) and the propagation loss of the signal during propagation from the second base station 2b to the mobile station 3 ($\Delta PT=PTT-PRT$). The mobile station 3 determines the propagation distance DS from the first base station 2a to the mobile station 3 and the propagation distance DT from the second base station 2b to the mobile station 3 from the propagation loss $\Delta PS$ and $\Delta PT$ and the propagation loss characteristics 90 and 91, and calculates the difference of the propagation distance (DS−DT). The mobile station 3 divides the difference of the propagation distance (DS−DT) by the propagation velocity of a radio wave v to determine the propagation delay difference between the propagation delay from the first base station 2a to the mobile station 3 and the propagation delay from the second base station 2b to the mobile station 3 (D=(DS−DT)/v).

Next, the mobile station 3 sets the synchronization timing between the second base station 2b and the mobile station 3 based on the synchronization timing between the first base station 2a and the mobile station 3 and the propagation delay difference D. FIG. 3 is a view for illustrating the method for setting the synchronization timing. At present, the synchronization of the transmission/reception timing of signal to the mobile station 3 between the first base station 2a and the second base station 2b is established. The reception timing of the reception symbol received by the mobile station 3 from the first base station 2a is delayed by DS/v from the transmission timing of the first base station 2a. The reception timing of the reception symbol received by the mobile station 3 from the second base station 2b is delayed by DT/v from the transmission timing of the second base station 2b.

Therefore, the synchronization timing to the second base station 2b that determines the timing for receiving the symbol transmitted from the second base station 2b is earlier by the delay difference D than the synchronization timing to the first base station 2a that determines the timing for receiving the symbol transmitted from the first base station 2a. Thus, the mobile station 3 determines the time earlier by the period D than the synchronization timing to the first base station 2a as the synchronization timing to the second base station 2b.

If the propagation distance DT is longer than the propagation distance DS (DT>DS), the mobile station 3 determines the time later by the period (D=(DT−DS)/v) than the synchronization timing to the first base station 2a as the synchronization timing to the second base station 2b.

In accordance with the communication system or the synchronization timing determining method as disclosed in the present application, it is possible to determine the synchronization timing between the mobile station 3 and the second base station 2b based on reception power from the second base station 2b. Therefore, since the synchronization timing can be determined in a period shorter than the method of establishing the synchronization by detecting the synchronization detecting pattern transmitted from the second base station 2b, the duration of communication interruption with the first base station 2a due to reception of signal from the second base station 2b can be shortened.

In accordance with the communication system or the synchronization timing determining method as disclosed in the present application, reception power from the second base station 2b is measured before the synchronization is established between the mobile station 3 and the second base station 2b. When reception power is measured before establishment of the synchronization, interference between symbols may occur and cause deterioration of measurement result.

Figure 4:
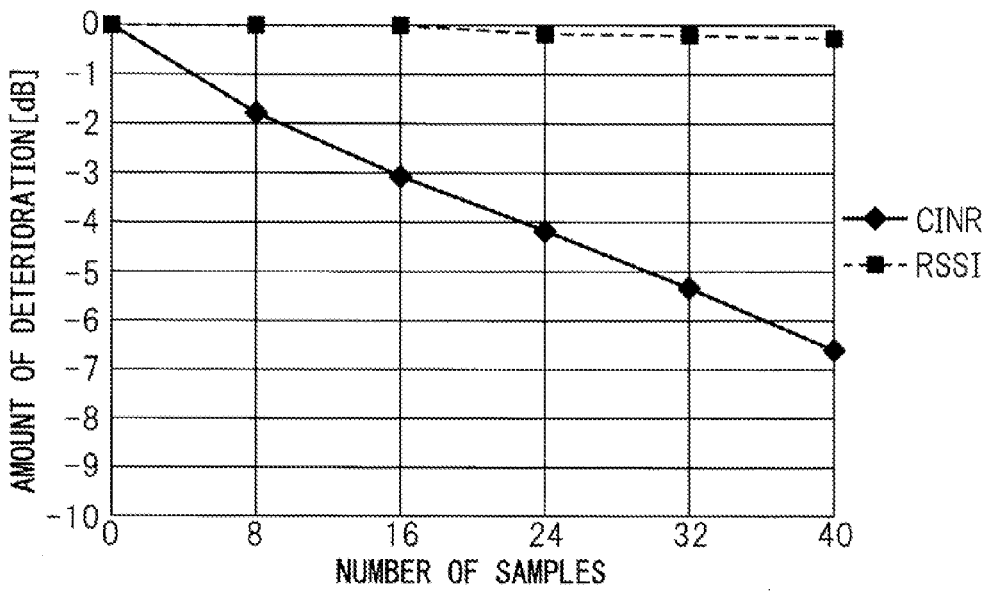
FIG. 4 is a graph depicting the deterioration characteristics of reception quality and reception power.

FIG. 4 is a graph depicting the deterioration characteristics of the measured value of the reception quality and the reception power. The solid lines in the graph represent deterioration of measured value of the reception quality CINR (Carrier to Interference and Noise Ratio) versus the sample number giving rise to inter-symbol interference. The dashed line in the graph represent deterioration of measured value of the reception power index RSSI (Received Signal Strength Indication) versus the sample number giving rise to inter-symbol interference.

As illustrated in FIG. 4, influence of inter-symbol interference on the measured value of reception power index RSSI is smaller as compared to influence on the reception quality value CINR. Therefore, even before establishment of the synchronization between the mobile station 3 and the second base station 2b, the reception power from the second base station 2b can be measured with small error.

3. Embodiments of the Mobile Station Apparatus

<3.1 Description of the Construction of a First Embodiment>

Figure 5:
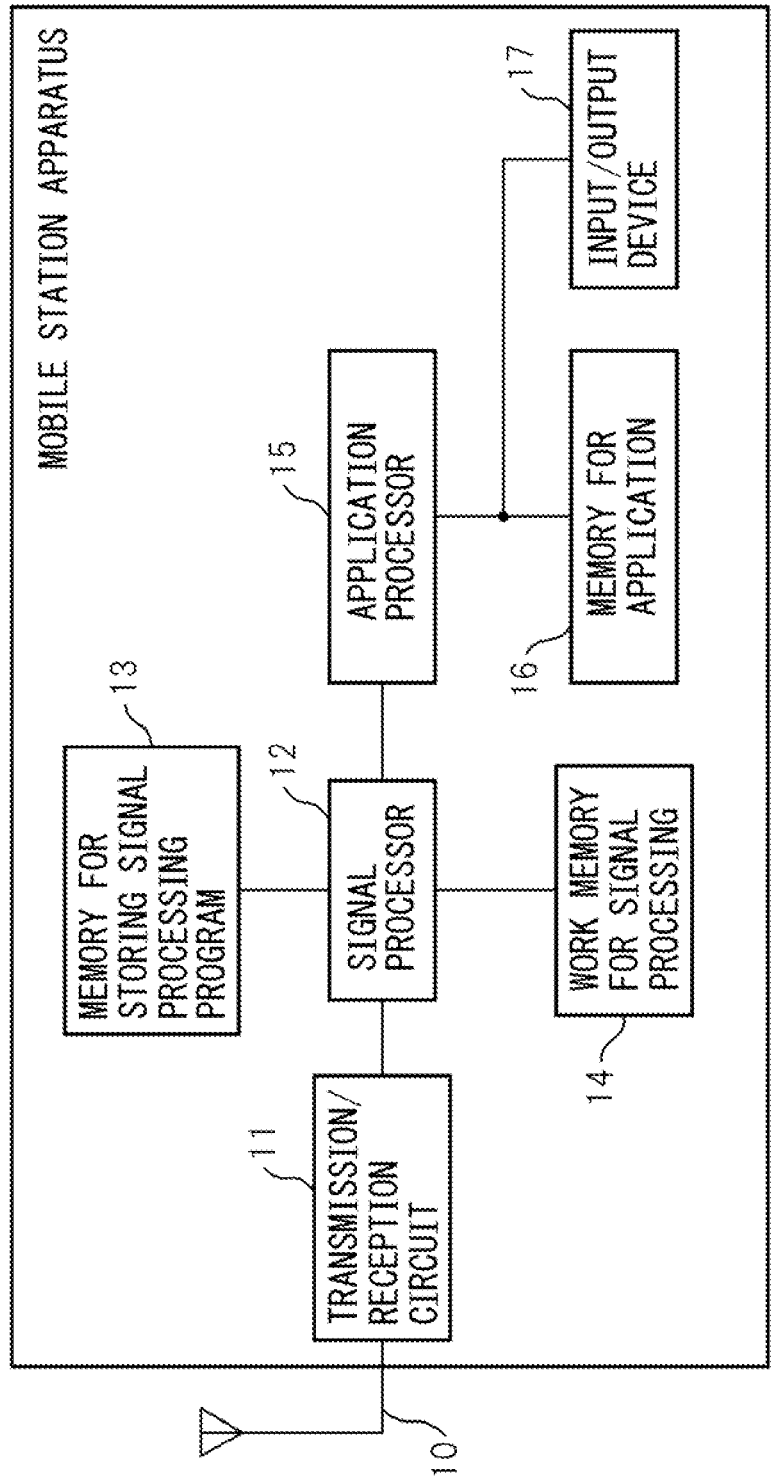
FIG. 5 is a view depicting an example of hardware construction of the mobile station apparatus.

Next, the construction and the operation of a mobile station 3 will be described. FIG. 5 is a view depicting an example of hardware construction of the mobile station 3. The mobile station 3 includes an antenna 10, a transmission/reception circuit 11, a signal processor 12, a memory for storing signal processing program 13, a work memory for signal processing 14, an application processor 15, a memory for application 16, and an input/output device 17.

The hardware construction depicted in FIG. 5 is only one example of hardware construction to realize the mobile station 3. Any other hardware construction may be adopted as long as the processing described below in this specification can be executed.

The transmission/reception circuit 11 carries out digital-to-analog conversion, analog-to-digital conversion, frequency conversion, signal amplification, and filtering of the radio signal transmitted and received between the mobile station 3 and the first base station 2a and the second base station 2b via the antenna 10. The application processor 15 carries out generation and extraction of user data transmitted and received between the mobile station 3 and the first base station 2a and the second base station 2b and information processing using user data. The memory for application 16 stores the application program executed by the application processor 15 and information and temporary data used in the execution. The input/output device 17 carries out reception processing for receiving user data input operation and output of user data to user.

The signal processor 12 executes base band signal processing other than the processing executed by the application processor 15. The memory for storing signal processing program 13 stores the signal processing program executed by the signal processor 12 and information used in the execution. Temporary data used in the execution of the signal processing program are stored in the work memory for signal processing 14.

Figure 6:
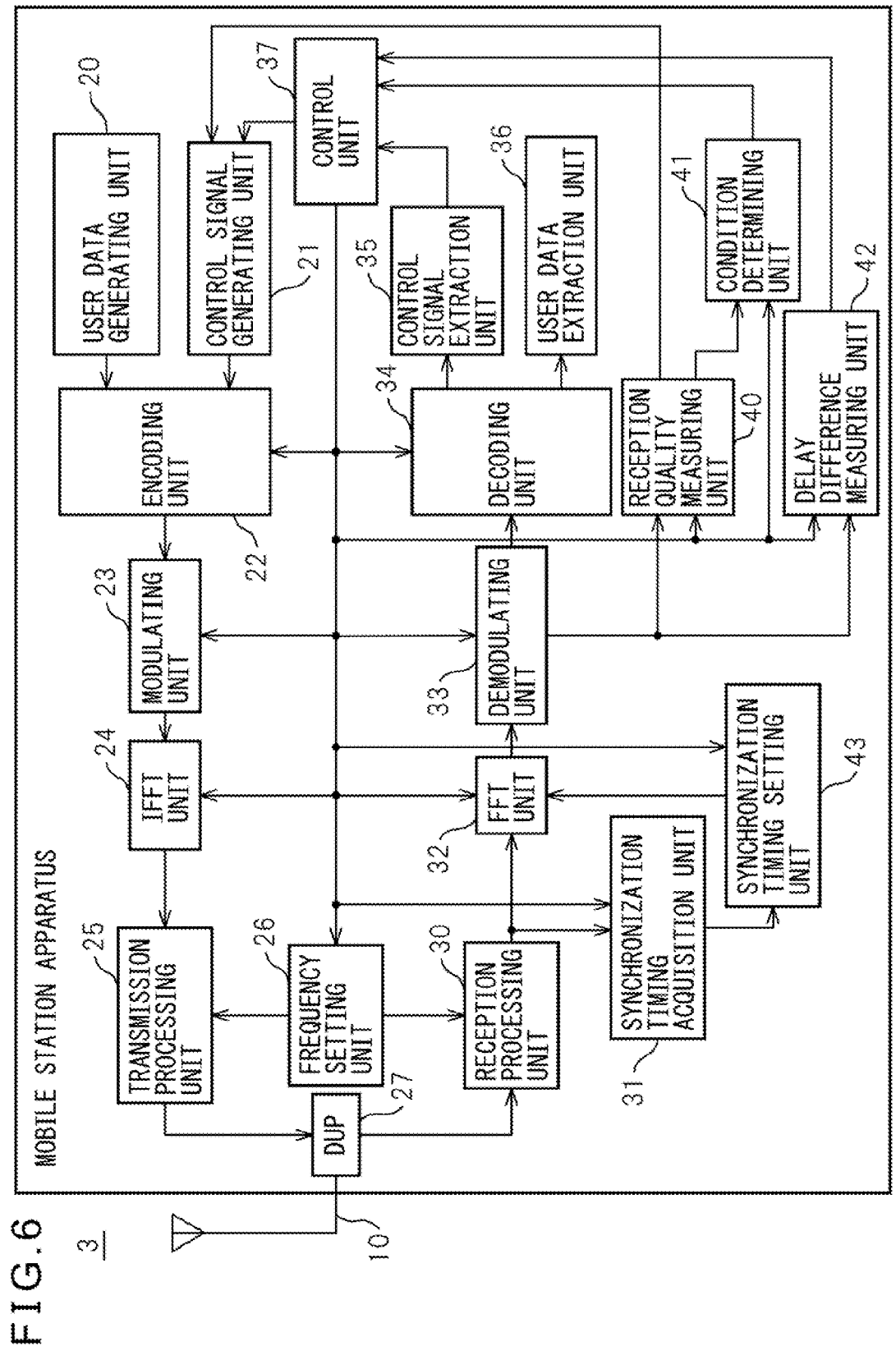
FIG. 6 is a view depicting a first exemplary construction of the mobile station apparatus.

FIG. 6 is a view depicting a first exemplary construction of the mobile station 3. The mobile station 3 includes an antenna 10, a user data generating unit 20, a control signal generating unit 21, an encoding unit 22, a modulating unit 23, an inverse fast Fourier transformation unit 24, a transmission processing unit 25, a frequency setting unit 26, and a duplexer 27. The mobile station 3 also includes a reception processing unit 30, a synchronization timing acquisition unit 31, a fast Fourier transformation unit 32, a demodulating unit 33, a decoding unit 34, a control signal extraction unit 35, a user data extraction unit 36, and a control unit 37.

The mobile station 3 further includes a reception quality measuring unit 40, a condition determining unit 41, a delay difference measuring unit 42, and a synchronization timing setting unit 43. In the appended drawings, the inverse fast Fourier transformation unit, the duplexer, and the fast Fourier transformation unit are denoted as "IFFT unit", "DUP", and "FFT unit", respectively.

Signal processing by the transmission processing unit 25, the duplexer 27 and the reception processing unit 30 is carried out by the transmission/reception circuit 11. Information processing by the user data generating unit 20 and the user data extraction unit 36 is carried out by the application processor 15 executing the application program stored in the memory for application 16. Signal processing by other constituents is carried out by the signal processor 12 executing the signal processing program stored in the memory for storing signal processing program 13. FIG. 6 mainly depicts the functions related to the description that follows. Therefore, the mobile station 3 may include constituents other than those depicted in the drawings. This also applies to other embodiments.

The user data generating unit 20 generates traffic data in accordance with the purpose of the user communication. The control signal generating unit 21 generates various control information to be notified by the mobile station 3 to the base station 2. The encoding unit 22 carries out error correction coding and interleave processing etc. by combining the traffic data with the control information. The modulating unit 23 performs bit repetition processing, insertion of pilot signal and preamble signal, primary modulation such as QPSK and QAM, and allocation to various subcarrier symbols of OFDM.

The inverse fast Fourier transformation unit 24 carries out inverse fast Fourier transformation on the symbol allocated to the subcarrier to thereby convert the symbol into time domain signal. The inverse fast Fourier transformation unit 24 also inserts guard interval into the time domain signal. The transmission processing unit 25 performs frequency conversion processing, amplification processing and waveform shaping on the time domain signal to thereby convert the digital base band signal into radio frequency signal.

The frequency setting unit 26 supplies the frequency of local signal used for frequency conversion of the radio frequency signal to the transmission processing unit 25 and the reception processing unit 30. By changing the frequency of the local signal, the transmission frequency at which the mobile station 3 transmits radio signal and the reception frequency at which the mobile station 3 receives radio signal are also changed. The duplexer 27 performs frequency division multiplexing and time division multiplexing of the usage of the antenna 10 by transmission signal and reception signal in order to share the antenna 10 common to transmission and reception. Radio frequency transmission signal that has passed through the duplexer 27 is transmitted from the antenna 10.

Signal received via the antenna 10 is separated from transmission signal in the duplexer 27 and is inputted into the reception processing unit 30. The reception processing unit 30 includes a band limiting filter, a reception low noise amplifier, a quadrature demodulator, an automatic gain control amplifier, and an analog-to-digital converter, and converts the reception radio frequency signal to digital base band signal. The synchronization timing acquisition unit 31 carries out detection of radio frame timing of the received signal and detection of the symbol synchronization timing, and notifies the fast Fourier transformation window start timing to the fast Fourier transformation unit 32. The synchronization timing acquisition unit 31 also inputs the synchronization timing information indicating the synchronization timing for the detected first base station 2a to the synchronization timing setting unit 43.

The fast Fourier transformation unit 32 sets the fast Fourier transformation window at the timing notified by the synchronization timing acquisition unit 31, and executes fast Fourier transformation on the inputted sample sequence to convert it into reception subcarrier symbol in frequency domain. In setting plural synchronization timings, the fast Fourier transformation unit 32 sets performs buffering processing on the inputted sample sequence, and sets plural fast Fourier transformation windows to perform fast Fourier transformation processing.

The demodulating unit 33 carries out propagation path estimation processing from the pilot signal inserted into subcarrier. The demodulating unit 33 also carries out demodulation processing to extract the reception coded symbol sequence. The decoding unit 34 carries out decoding processing, error correction processing and detection processing, and extracts reception data string. The control signal extraction unit 35 extracts control information used for communication control from received data, and notifies the extracted control information to the control unit 37.

The control information notified to the control unit 37 by the control signal extraction unit 35 may include transmission power information indicating transmission power of the first base station 2a and the second base station 2b. The control information may include information of the transmission frequency for transmission of reference signal by the first base station 2a and the second base station 2b used for reception power measurement by the mobile station 3. The first base station 2a may transmit these control information to the mobile station 3, for example, as broadcast information.

The user data extraction unit 36 extracts traffic data in accordance with user's communication purpose from the reception data string. The control unit 37 controls the operation of the constituents 22~24, 26; and 31~34, in accordance with the instruction from higher layer functions, or control information extracted from the received data.

The reception quality measuring unit 40 measures the quality of received signal from known signal detected by the demodulating unit 33. For example, the reception quality measuring unit 40 may calculate CINR as the quality of the received signal. Also, the reception quality measuring unit 40 may use pilot, preamble as known signal to measure the quality of the received signal. The reception quality measuring unit 40 inputs the measurement result of the quality of the received signal to the control signal generating unit 21. The control signal generating unit 21 generates the information of the quality of received signal measured by the reception quality measuring unit 40 as control signal. The information of the quality of received signal is transmitted to the first base station 2a as control information.

The condition determining unit 41 determines whether or not the first condition for determining whether or not to start measurement of reception quality from the second base station 2b by the reception quality measuring unit 40 is satisfied. The condition determining unit 41 may determine whether or not the first condition is satisfied in accordance with whether or not the prescribed index to determine whether or not to measure reception quality of the second base station 2b exceeds a prescribed threshold. The prescribed index may be the reception quality from the first base station 2a measured by the reception quality measuring unit 40. Also, the prescribed index may be the reception power intensity from the first base station 2a. The result of determination by the condition determining unit 41 is inputted to the control unit 37.

When reception quality from the second base station 2b is to be measured, synchronization between the second base station 2b and the mobile station 3 has to be established. The control unit 37 determines whether or not the second condition for determining whether or not to start measurement of reception power from the second base station 2b used in determination of synchronization timing between the second base station 2b and the mobile station 3 is satisfied. The control unit 37 may determine whether or not the second condition is satisfied in accordance with whether or not difference between above prescribed index and the prescribed threshold is within a prescribed range.

Thus, as the prescribed index approaches the prescribed threshold, the second condition is satisfied before the first condition is satisfied. Therefore, before the measurement of reception quality of the second base station 2b by the reception quality measuring unit 40 is started, the measurement of the reception power from the second base station 2b is started.

Figure 7:
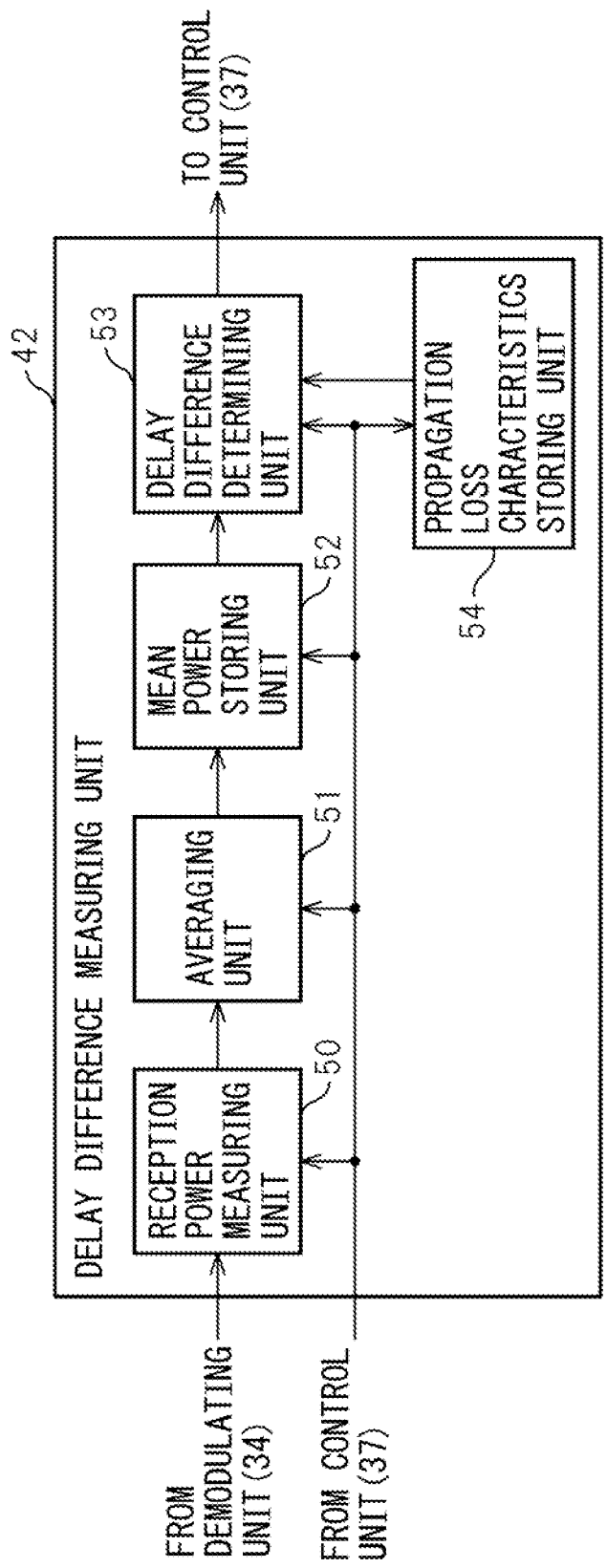
FIG. 7 is a view depicting an example of the construction of the delay difference measuring unit.

The delay difference measuring unit 42 measures the propagation delay difference between the propagation delay of the radio wave received from the first base station 2a and the propagation delay of the radio wave received from the second base station 2b. FIG. 7 is a view depicting an example of the construction of the delay difference measuring unit 42. The delay difference measuring unit 42 includes a reception power measuring unit 50, an averaging unit 51, an average power storage unit 52, and a delay difference determining unit 53.

The reception power measuring unit 50 measures the reception power index RSSI of received signal from the base station 2. For example, the reception power measuring unit 50 may measure the reception power index RSSI of received signal during the reception period of the reference signal transmitted from the base station 2. While the above described second condition is not satisfied, the reception power measuring unit 50 measures the reception power of the received signal from the first base station 2a.

If the second condition described above is satisfied, the control unit 37 outputs the instruction for switching the reception frequency in the reception processing unit 30 to the transmission frequency at which the second base station 2b transmits the reference signal, to the frequency setting unit 26. The control unit 37 switches the reception frequency of the mobile station 3, during the period in which the reference signal transmitted from the first base station 2a arrives at the mobile station 3, from the transmission frequency of the first base station 2a to the transmission frequency of the second base station 2b.

The control unit 37 may switch the reception frequency to the transmission frequency of the second base station 2b each time the transmission period of the reference signal is reached, or periodically, i.e., it may switch the reception frequency once among plural transmission period of the reference signal. If plural base stations 2 around the first base station 2a are selected as the second base station 2b, the control unit 37 may switch the reception frequency successively to each of the transmission frequency of the plural second base stations 2b.

The averaging unit 51 calculates the long term mean value of reception power measured for the first base station 2a and each second base station 2b. The mean power storing unit 52 stores the mean reception power calculated by the averaging unit 51. The delay difference determining unit 53 calculates, from the transmission power information of the first base station 2a and the second base station 2b extracted from the control information and the calculated mean reception power, respective propagation loss of the signal transmitted from the first base station 2a and the second base station 2b.

The delay difference determining unit 53 calculates the propagation distance difference based on the propagation loss and propagation loss characteristics, and converts the propagation distance difference to the propagation delay difference. The propagation loss characteristics may be, for example, a table value defining the relation between the propagation distance and the propagation loss. The propagation loss characteristics may be, for example, a formula defining the relation between the propagation distance and the propagation loss.

The delay difference determining unit 53 may calculate the propagation distance difference by using, for example, the propagation loss characteristics that varies in dependence on the transmission frequency of the base station 2. Also, the delay difference determining unit 53 may calculate the propagation distance difference by using, for example, propagation loss characteristics proper to each base station 2. The delay difference measuring unit 42 may include a propagation loss characteristics storing unit 54. The propagation loss characteristics storing unit 54 may store the propagation loss characteristics beforehand at the time of shipping the product, or may store the propagation loss characteristics transmitted from the base station 2 as control signal. The delay difference determining unit 53 outputs the calculated propagation delay difference to the control unit 37.

Referring to FIG. 6, if the first condition described above is satisfied, the control unit 37 outputs the instruction to measure the reception quality from the second base station 2b during the frame period defined with the first base station 2a, to the reception quality measuring unit 40. The control unit 37 inputs the propagation delay difference determined by the delay difference determining unit 53 to the synchronization timing setting unit 43.

The synchronization timing setting unit 43 defines the synchronization timing between the second base station 2b and the mobile station 3 by adding the propagation delay difference to the synchronization timing between the first base station 2a and the mobile station 3. For example, the synchronization timing setting unit 43 defines the reception timing of the symbol received from the second base station 2b by adding the propagation delay difference to the reception timing of the symbol received from the first base station 2a. In accordance with the synchronization timing to the second base station 2b, the synchronization timing setting unit 43 notifies the fast Fourier transformation window start timing for converting the symbol received from the second base station 2b to the fast Fourier transformation unit 32.

The reception quality measuring unit 40 measures the reception quality of the received signal from the second base station 2b by using the received signal from the second base station 2b converted by the fast Fourier transformation unit 32. The control signal generating unit 21 transmits the reception quality information from the second base station 2b to the first base station 2a as control signal.

In the construction depicted in FIG. 6, in the communication from a radio base station to a mobile terminal (forward link communication) and in the communication from a mobile terminal to a radio base station (reverse link communication), OFDM (Orthogonal Frequency Division Multiplexing) communication system is applied. However, reverse link communication is not limited to OFDM communication system, and another communication system, such as a single carrier communication system may be used.

<3.2 Description of Reception Quality Measurement by Mobile Station Apparatus>

Figure 8:
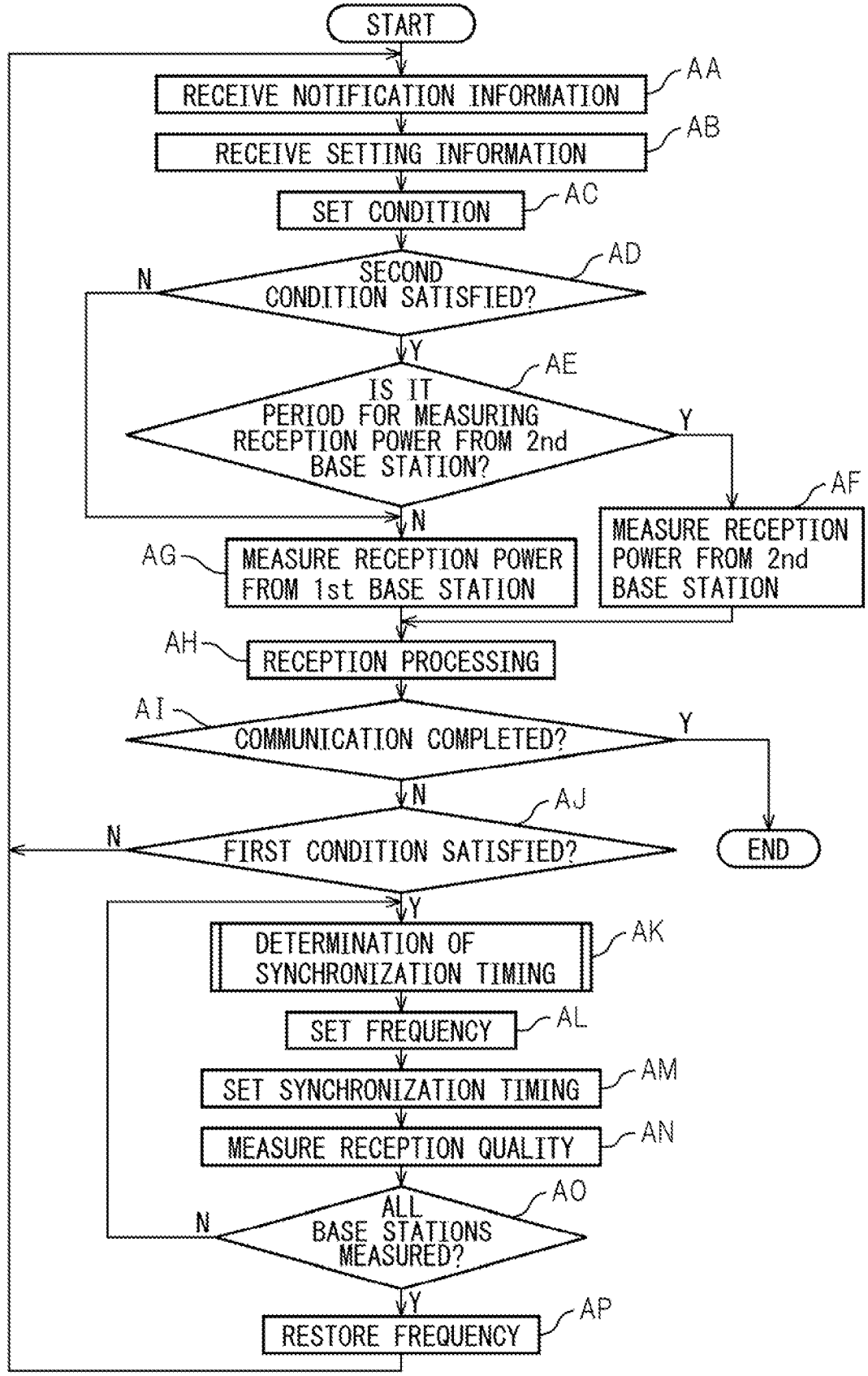
FIG. 8 is a view for illustrating a first example of the reception quality measuring unit.
Figure 9:
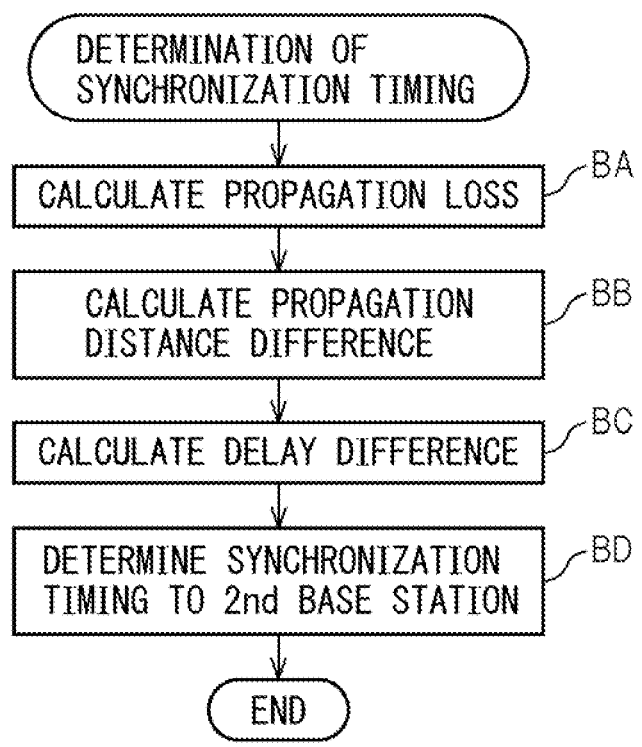
FIG. 9 is a view for illustrating the synchronization timing determination processing.

Next, measurement of reception quality of received signal from the second base station 2b will be described. FIG. 8 is a view useful for illustrating a first example of the reception quality measurement processing. In other embodiments, each of the following operations AA~AP may be a step.

In operation AA, the mobile station 3 receives broadcast information transmitted from the first base station 2a. The control signal extraction unit 35 extracts the broadcast information as control signal, and inputs it to the control unit 37. This broadcast information includes the transmission power information of the first base station 2a and the second base station 2b, as well as information on the transmission frequency for the first base station 2a and the second base station 2b to transmit reference signal.

In operation AB, the mobile station 3 receives, from the first base station 2a, the information designating the above-described first condition and second condition transmitted from the first base station 2a. The information designating the first condition and second condition may be, for example, the prescribed threshold or the prescribed range to be compared with the prescribed index described above. In operation AC, the condition determining unit 41 sets the first condition for determining whether or not to start measurement of reception quality from the second base station 2b based on the information received in operation AB. The control unit 37 also sets the second condition for determining whether or not to start measurement of reception power from the second base station 2b based on the information received in operation AB. The second condition may be decided by the mobile station 3 in accordance with the moving speed or the like without designation from the first base station 2a.

In operation AD, the control unit 37 determines whether or not the second condition is satisfied. If the second condition is satisfied (operation AD: Y), the processing proceeds to operation AE. If the second condition is not satisfied (operation AD: N), the processing proceeds to operation AG.

In operation AE, the control unit 37 determines whether or not it is the period for measuring reception power from the second base station 2b. Reception power from the second base station 2b may be measured each time the first base station 2a transmits reference signal, or may be measured periodically, i.e., once among plural transmission periods of a reference signal. If it is the period for measuring reception power from the second base station 2b (operation AE: Y), the processing proceeds to operation AF. If it is not the period for measuring reception power from the second base station 2b (operation AE: N), the processing proceeds to operation AG.

In operation AF, the control unit 37 switches the reception frequency of the mobile station 3 from the transmission frequency of the first base station 2a to the transmission frequency of the second base station 2b. The reception power measuring unit 50 measures the reception power of received signal from the second base station 2b. The measured reception power is averaged by the averaging unit 51, and is stored in the mean power storing unit 52. When plural base stations 2 around the first base station 2a are selected as the second base station 2b, operation AF is executed for each of the plural second base stations 2b. After operation AF, the processing proceeds to operation AH.

In operation AG, the reception power measuring unit 50 measures the reception power of received signal from the first base station 2a. The measured reception power is averaged, and is stored in the mean power storing unit 52. After operation AG, the processing proceeds to operation AH. In operation AH, the mobile station 3 receives signal transmitted from the first base station 2a.

In operation AI, the control unit 37 determines whether or not communication by the mobile station 3 has been completed. If the communication has been completed (operation AI: Y), the processing is terminated. If the communication has not been completed (operation AI: N), the processing proceeds to operation AJ. In operation AJ, the condition determining unit 41 determines whether or not the first condition is satisfied. If the first condition is satisfied (operation AJ: Y), the processing proceeds to operation AK. If the first condition is not satisfied (operation AJ: N), the processing returns to operation AA.

In operation AK, the synchronization timing determination processing is carried out. In other embodiments, each of operations BA~BD described below may be a step. In operation BA, the delay difference determining unit 53 calculates the propagation loss of signal transmitted from the first base station 2a and the second base station 2b, respectively.

In operation BB, the delay difference determining unit 53 calculates the propagation distance difference based on the propagation loss and the propagation loss characteristics. in operation BC, the delay difference determining unit 53 divides the calculated propagation distance difference by propagation velocity of a radio wave to convert it to time, and thus calculated the propagation delay difference. In operation BD, the synchronization timing setting unit 43 obtains the synchronization timing between the second base station 2b and the mobile station 3 by adding the propagation delay difference to the synchronization timing between the first base station 2a and the mobile station 3.

Referring to FIG. 8, after operation AK, the processing proceeds to operation AL. In operation AL, in order to measure reception quality from the second base station 2b, the control unit 37 switches the reception frequency of the mobile station 3 to the transmission frequency of the second base station 2b at the frame start time defined with the first base station 2a.

In operation AM, the synchronization timing setting unit 43 sets the timing of the fast Fourier transformation window start for transforming the symbol received from the second base station 2b in accordance with the synchronization timing to the second base station 2b determined in operation BD. In operation AN, the reception quality measuring unit 40 measures the reception quality of the received signal from the second base station 2b. In operation AO, the control unit 37 determines whether or not reception quality from all the second base stations 2b has been measured. If there is a second base station 2b for which reception quality has not been measured (operation AO: N), the processing returns to operation AK, and reception quality of next second base station 2b is measured.

If reception quality from all the second base stations 2b has been measured (operation AO: Y), the processing proceeds to operation AP. In operation AP, the control unit 37 returns the reception frequency of the mobile station 3 to the transmission frequency of the first base station 2a. Thereafter, the processing returns to operation AA.

In accordance with the present embodiment, synchronization timing between the mobile station 3 and the second base station 2b can be determined based on reception power from the second base station 2b. Therefore, compared to the method of establishing synchronization by detecting the synchronization detection pattern, synchronization timing to the second base station 2b can be determined in a shorter time. Thus, the duration of interruption of communication with the first base station 2a can be shortened, and the throughput of communication with the first base station 2a can be improved.

By determining satisfaction of the second condition, the reception power from the second base station 2b can be measured before the start of measurement of reception quality of the second base station 2b. Therefore, when the first condition is satisfied and measurement of reception quality of the second base station 2b is started, synchronization timing between the mobile station 3 and the second base station 2b can be established based on the reception power having been already measured. Thus, as compared to conventional method of establishing synchronization by detection of the synchronization detection pattern in the allocated time period for measurement of reception quality, the synchronization processing can be completed in a shorter time.

<3.3 Description of the Second Embodiment>

Figure 10:
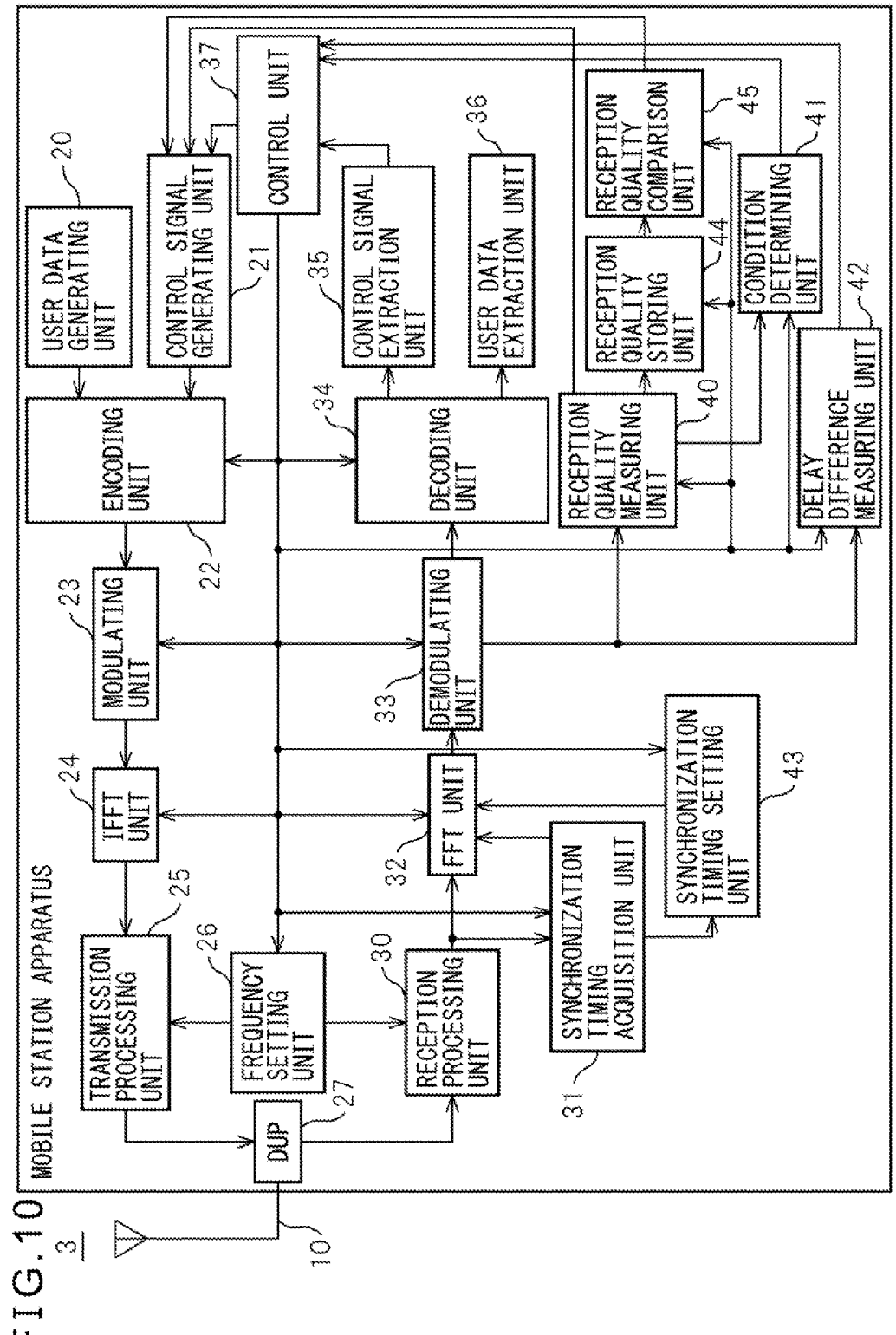
FIG. 10 is a view depicting a second exemplary construction of the mobile station apparatus.

Next, other embodiment of the mobile station 3 will be described. FIG. 10 is a view depicting a second exemplary construction of the mobile station 3. Constituents identical to those depicted in FIG. 6 are denoted by same reference numerals or symbols. Operation of the constituents denoted by same reference numerals or symbols is the same unless otherwise indicated. The mobile station 3 includes a reception quality storing unit 44 and a reception quality comparison unit 45.

Figure 11A:
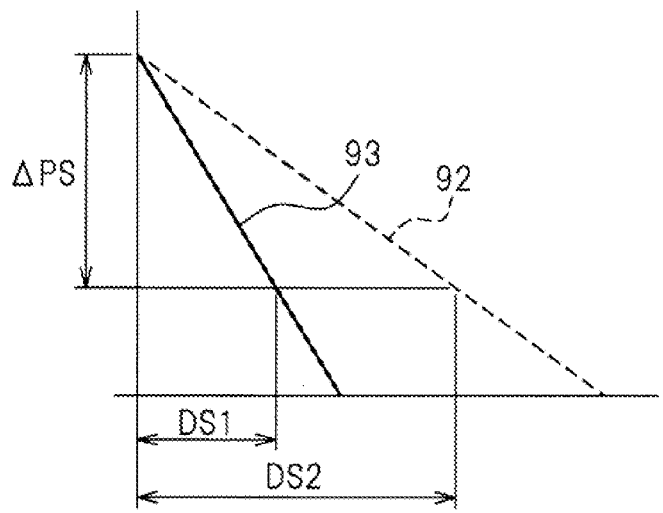
FIG. 11A is a view for illustrating a second example of the method for calculating the propagation distance difference.
Figure 11B:
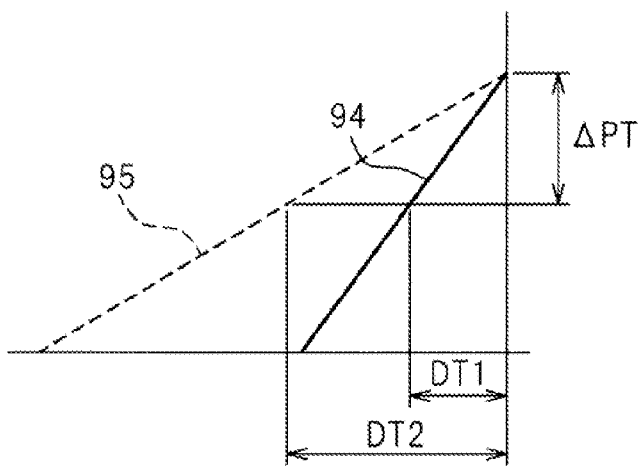
FIG. 11B is a view for illustrating a second example of the method for calculating the propagation distance difference.
Figure 11C:
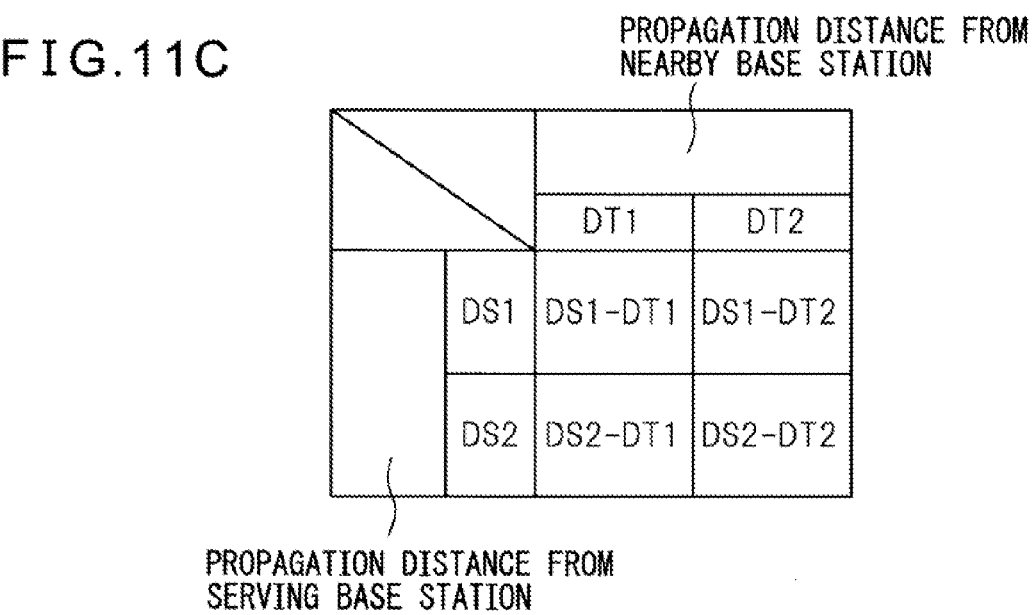
FIG. 11C is a view for illustrating a second example of the method for calculating the propagation distance difference.

In the second embodiment, plural propagation loss characteristics are designated for the same base station 2. An example of plural propagation loss characteristics may be, for example, propagation loss characteristics in a LOS (Line of Sight) environment and propagation loss characteristics in a NLOS (Non Line of Sight) environment. The delay difference determining unit 53 calculates plural propagation distance differences by calculating the propagation distance based on respective plural propagation loss characteristics. Referring to FIG. 11(A)~FIG. 11(C), method of calculating propagation distance difference in the second embodiment will be described below.

Reference numerals 92 and 93 in FIG. 11(A) denote plural propagation loss characteristics of a signal transmitted from the first base station 2a, respectively. Reference numerals 94 and 95 in FIG. 11(B) denote plural propagation loss characteristics of a signal transmitted from the second base station 2b, respectively. For the first base station 2a, the delay difference determining unit 53 calculates plural propagation distance DS1 and DS2 based on propagation loss ΔPS and plural propagation loss characteristics 92 and 93, respectively. For the second base station 2b, the delay difference determining unit 53 calculates plural propagation distance DT1 and DT2 based on propagation loss ΔPT and plural propagation loss characteristics 94 and 95, respectively.

The delay difference determining unit 53 calculates plural propagation distance difference for plural combinations of the plural propagation distance DS1 and DS2 calculated for the first base station 2a and plural propagation distance DT1 and DT2 calculated for the second base station 2b apparatus. FIG. 11(C) is a view for illustrating the propagation distance difference calculated by the delay difference determining unit 53. The delay difference determining unit 53 calculates the propagation distance difference (DS1−DT1) for the combination of DS1 and DT1. Also, the delay difference determining unit 53 calculates the propagation distance difference (DS1−DT2) for the combination of DS1 and DT2. The delay difference determining unit 53 calculates the propagation distance difference (DS2−DT1) for the combination of DS2 and DT1. Also, the delay difference determining unit 53 calculates the propagation distance difference (DS2−DT2) for the combination of DS2 and DT2.

The delay difference determining unit 53 converts each of these plural propagation distance differences into propagation delay difference. The synchronization timing setting unit 43 defines plural synchronization timings between the second base station 2b and the mobile station 3 based on each of the plural propagation delay differences. The reception quality measuring unit 40 measures reception quality from the second base station 2b based on each of the received signal received in accordance with the plural synchronization timings defined by the synchronization timing setting unit 43.

Each of the reception quality measured at plural synchronization timings is stored in the reception quality storing unit 44. The reception quality comparison unit 45 compares the reception quality measured at plural synchronization timings, and inputs the best value among them to the control signal generating unit 21 as the reception quality from the second base station 2b.

In accordance with the present embodiment, when plural propagation loss characteristics are supposed for same base station 2, it is possible to measure reception quality from the second base station 2b using synchronization timing obtained with suitable propagation loss characteristics. Since suitable propagation loss characteristics can be used to determine synchronization timing, measurement accuracy of the reception quality from the second base station 2b can be improved.

Figure 12:
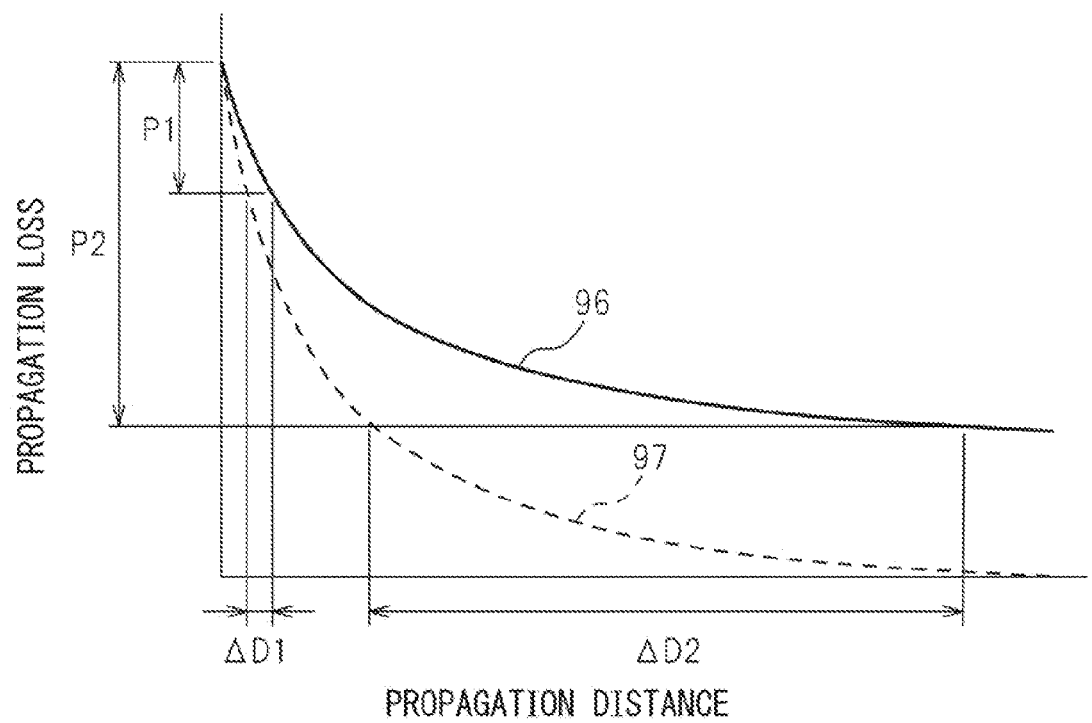
FIG. 12 is a view for illustrating a third example of the method for calculating the propagation distance difference.

The propagation loss often decays inversely as power of the propagation distance. Thus, when absolute value of the propagation loss is small, as compared to when absolute value of the propagation loss is large, difference of transmission distance calculated from plural propagation loss characteristics becomes remarkably small. FIG. 12 is a schematic view depicting the propagation loss characteristics that exhibits such decay characteristics.

A difference of propagation distance calculated in accordance with two propagation loss characteristics 96 and 97 for propagation loss of P2 is ΔD2, and a difference of propagation distance calculated in accordance with two propagation loss characteristics 96 and 97 for propagation loss of P1 is ΔD1. As depicted in the Figure, the difference of propagation distance ΔD1 calculated for propagation loss P1 that is smaller than propagation loss P2 is remarkably smaller than the difference of propagation distance ΔD2 calculated for propagation loss P2.

Therefore, when propagation loss is smaller than a prescribed value, in place of propagation distance calculated for each of plural propagation loss characteristics defined for one base station 2, the delay difference determining unit 53 may calculate the propagation delay difference based on only one propagation distance representative of these plural propagation distances. By using one propagation distance representative of plural propagation distances, one or both of the number of propagation distances calculated for the first base station 2a and the number of propagation distances calculated for the second base station 2b is reduced. As a result, the number of combinations of the propagation distances calculated for the first base station 2a and the propagation distances calculated for the second base station 2b is reduced, and the number of synchronization timings set by the synchronization timing setting unit 43 is reduced and the number of measurement of reception quality of the second base station is also reduced.

For example, the delay difference determining unit 53 may adopt a mean value of plural propagation distances as the representative propagation distance. When the synchronization timing to the second base station 2b is earlier than proper timing, deterioration may in some case become greater as compared to when it is later than proper timing. In this case, the delay difference determining unit 53 may adopt the longest propagation distance among the plural propagation distances calculated for the first base station 2a as the representative propagation distance, and adopt the shortest propagation distance among the plural propagation distances calculated for the second base station 2b as the representative propagation distance.

In accordance with the present embodiment, when plural propagation loss characteristics are presumed to apply to same base station 2, increase of the number of measurement of reception quality of the second base station 2b can be suppressed, so that measurement time of reception quality of the second base station 2b can be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A mobile station apparatus configured to:
    receive transmission power information of a first base station apparatus to which the mobile station is connected and a second base station apparatus other than the first base station apparatus, and transmission frequency information of reference signal of the second base station apparatus, from said first base station apparatus;
    switch a reception frequency between transmission frequencies of reference signal of said first base station apparatus and said second base station apparatus, in a transmission period for said first base station apparatus to transmit reference signal;
    measure a reception power received from said first base station apparatus and said second base station apparatus in said transmission period;
    determine a propagation loss of a radio wave received from said first base station apparatus and said second base station apparatus based on the reception power measured and transmission power information received;
    determine a propagation delay difference between the radio wave received from said first base station apparatus and the radio wave received from said second base station apparatus based on said propagation loss;
    determine a synchronization timing to said second base station apparatus based on synchronization timing to said first base station apparatus and said propagation delay difference.

2. The mobile station apparatus as claimed in claim 1, further comprising:
    neasuring reception quality of said first base station apparatus and said second base station apparatus;
    transmitting information on reception quality measured to said first base station apparatus;
    calculating an index for judging a necessity of measurement of reception quality of said second base station apparatus;
    determining whether or not said index exceeds a threshold value; and
    determining whether or not difference of said index from said threshold value is within a range;

wherein, if a difference in said index from said threshold value is within said range, carry out switching of a reception frequency and perform measurement of reception power from said second base station apparatus; and wherein, if said index exceeds the threshold value, measuring reception quality from said second base station apparatus based on reception signal received at the synchronization timing.

3. The mobile station apparatus as claimed in claim 2;

wherein plural propagation loss characteristics are defined for each of said first base station apparatus and said second base station apparatus;

wherein, for each of said plural propagation loss characteristics, determining propagation distance based on each propagation loss characteristics, and determining propagation delay difference for each of plural combinations of plural propagation distances determined for said first base station apparatus and plural propagation distances determined for said second base station apparatus;

determining synchronization timing for propagation delay difference determined for said plural combinations;

measuring reception quality from said second base station apparatus based on reception signal received at plural synchronization timings; and transmitting best reception quality among plural reception qualities measured.

4. The mobile station apparatus as claimed in claim 3, wherein, if said propagation loss is smaller than a value, determining propagation delay difference based on, instead of said plural propagation distances, one propagation distance representative of the plural propagation distances.

5. The mobile station apparatus as claimed in claim 1, comprising determining said propagation loss based on propagation loss characteristics in accordance with transmission frequency of said reference signal of said first base station apparatus and said second base station apparatus.

6. The mobile station apparatus as claimed in claim 1, comprising determining said propagation loss based on proper propagation loss characteristics defined for said first base station apparatus and said second base station apparatus.

7. The mobile station apparatus as claimed in claim 6, further comprising receiving information of said propagation loss characteristics from said first base station apparatus.

8. A method of determining synchronization timing, comprising:

transmitting transmission power information of a first base station apparatus to which a mobile station apparatus is connected and a second base station apparatus other than the first base station apparatus, as well as transmission frequency information of reference signal of the second base station apparatus, from said first base station apparatus to said mobile station apparatus;

switching reception frequency of said mobile station apparatus in a transmission period for said first base station apparatus to transmit reference signal between transmission frequencies of reference signal of said first base station apparatus and said second base station apparatus;

measuring reception power received by said mobile station apparatus from said first base station apparatus and said second base station apparatus in said transmission period;

determining propagation loss of a radio wave received from said first base station apparatus and said second base station apparatus to said mobile station apparatus based on the reception power measured in said transmission period and transmission power information transmitted from said first base station apparatus;

determining propagation delay difference between radio waves received from said first base station apparatus and said second base station apparatus to said mobile station apparatus based on said propagation loss;

determining synchronization timing of said second base station apparatus to said mobile station apparatus based on synchronization timing of said first base station apparatus to said mobile station apparatus and said propagation delay difference.

* * * * *